(12) United States Patent
Foster

(10) Patent No.: US 7,179,385 B2
(45) Date of Patent: Feb. 20, 2007

(54) METHOD FOR TREATING PAINT BOOTH WATER SYSTEMS

(75) Inventor: Kathryn E. Foster, Sterling Heights, MI (US)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 121 days.

(21) Appl. No.: 10/454,956

(22) Filed: Jun. 5, 2003

(65) Prior Publication Data
US 2004/0245181 A1    Dec. 9, 2004

(51) Int. Cl.
*C02F 1/56* (2006.01)
*C02F 103/14* (2006.01)

(52) U.S. Cl. .......................... 210/728; 95/152; 134/38; 210/735; 210/930

(58) Field of Classification Search .............. 210/728, 210/930
See application file for complete search history.

(56) References Cited

U.S. PATENT DOCUMENTS

| | | | | |
|---|---|---|---|---|
| 4,629,572 A | * | 12/1986 | Leitz et al. ................. | 210/714 |
| 4,656,059 A | * | 4/1987 | Mizuno et al. ............. | 427/345 |
| 4,904,393 A | * | 2/1990 | Mitchell et al. ............ | 210/712 |
| 5,382,378 A | * | 1/1995 | Guerrini et al. ............ | 252/181 |
| 5,599,884 A | * | 2/1997 | Beleck ....................... | 525/509 |
| 6,136,220 A | * | 10/2000 | Agree et al. ................ | 252/180 |
| 6,627,086 B2 | * | 9/2003 | Mahoney et al. ........... | 210/725 |

* cited by examiner

*Primary Examiner*—Peter A. Hruskoci
(74) *Attorney, Agent, or Firm*—Stephen D. Harper; Mary K. Cameron

(57) ABSTRACT

The invention is a composition and method for treating paint booth water systems to facilitate paint removal. The composition comprises water, solid particles of insoluble organic polymer, such as, by way of non-limiting example, urea methanal copolymer, preferably including less than 50 weight percent of particles of diameter of 1 micron or less, and optionally surfactants, thickeners, polymeric flocculents different from the organic polymer, clarifiers, anti-corrosive components, and/or biocides.

18 Claims, No Drawings

METHOD FOR TREATING PAINT BOOTH WATER SYSTEMS

FIELD OF THE INVENTION

This invention relates to a composition for detackifying and flocculating paint overspray in paint booth water systems and a method of removing overspray from a paint booth water system.

BACKGROUND OF THE INVENTION

Many industrial and consumer articles, e.g. machine parts, vehicle bodies, furniture and sporting equipment, are spray painted in enclosed areas called paint spray booths. Generally a significant portion of the paint is oversprayed, that is, not transferred to the object being coated. Such waste paint is generally referred to as oversprayed paint. The purposes of paint spray booths are to contain any fumes or paint overspray, reduce the risk of contamination of the article being painted and protect the health of the workers at the site. Smaller booths may employ filters to remove the paint overspray from the air, but larger systems usually use a recirculating water system for this purpose. Paint spray booths utilizing a recirculating water system are generally comprised of a spraying chamber, a duct system for passing an air stream down through the chamber, and a water system including a sump and a number of pipes, pumps, meters and valves. Airflow through the chamber forces the paint overspray into contact with the resident water in the sump, thereby transferring the paint from the air into the water. The result is the oversprayed paint contacts and is captured by the recirculating water of the spray booth.

During paint spray booth use, significant concentrations of paint can build up in the water system. Non-water-based paint, e.g. organic solvent-based paint, tends to remain tacky in the water system and can plug pipes, pumps meters & valves, as well as coat the inside of the sump, eventually forming a difficult to remove and hazardous sludge. Paint sludge is a known medium for microbial growth, which is a health and environmental concern during use of the system and in the removal and disposal of the sludge. It is desirable to reduce the microbial growth by preventing paint deposits in the recirculating water system, including at the bottom of the sump.

Both water-based and non-water-based paint accumulate in the recirculating water of the system, unless the paint is removed. Paint that is water-based generally disperses in the recirculating water system without detackification. Over time, use of either type of paint in a booth results in paint-saturated water that is progressively less effective in its air scrubbing action. The paint-saturated water must either be replaced or treated to remove accumulated paint. Replacement and disposal of resident water that is paint-saturated is uneconomical and raises environmental concerns, thus treatment of the water is preferred.

In order to render the paint more readily removable from the water, to preserve its air cleaning action, water in the sump is generally treated so that the oversprayed paint, when it is brought into contact with such water, forms paint sludge. Paint sludge typically floats at or near the surface of the sump water or sinks. Paint sludge that sinks is generally removed by draining the water and shoveling or scraping the sludge out of the sump, which increases expensive downtime for the paint booth. For ease of removal, it is preferred that as much as possible of the paint sludge formed is of the floating variety, which can be removed by skimming or similar means. Removal of floating paint sludge can be a continuous or non-continuous process and is useful in reducing downtime of the paint booth. The tendency of such paint sludge to float also permits reasonably efficient water recycling, because relatively sludge-free water can be drawn from near the bottom of the sump.

It is important to the efficient operation of paint spray booths, and to the efficient waste treatment of such oversprayed paint wastes, that the oversprayed paint be detackified when it contacts the water system. Typically, solvent-based paint requires detackification, flocculation and flotation for removal, while water-based paint usually requires only flocculation and flotation. By detackification is meant herein that the adhesive properties (tackiness) of the paint overspray are minimized or eliminated. It is undesirable to have such paint overspray adhere to any surface that may be encountered in the spray booth, or during its removal from the spray booth and subsequent disposal.

It is also advantageous if a paint detackifying agent promotes the formation of paint sludge that can be efficiently removed and dewatered. Ideally, the detackifying agent also acts as a flocculent. Removal and dewatering of paint sludge is affected by a plurality of sludge characteristics, including besides detackification, cohesiveness to promote easy sludge removal, low water content for total volume reduction, low or no solvent encapsulation to reduce the hazardous properties of the sludge, particle or agglomerate size of floating sludge and the like. High solids and minimum solvent are requirements under most sludge landfill disposal regulations. An initial dewatering of the sludge occurs during sludge removal, and the sludge collected may be further dewatered using such devices as a plate and frame filter, a vacuum filter, a centrifuge, a twin belt press or the like. For effective dewatering during sludge removal, and when the collected sludge is further dewatered using a dewatering device, the sludge paint must be well detackified.

Chemicals for detackifying paint and chemicals for flocculating paint are known in the industry. Generally, detackifying chemicals in the paint booth water system cause changes in the surface characteristics of paint droplets captured in the water system rendering them less sticky or tacky. Reducing the tackiness of the paint droplets reduces the deposition of the captured paint on reservoir surfaces and piping portions of the paint booth water system.

Detackifiers allow captured paint to be dispersed in the water system, but often do not facilitate the paint's removal from the water system. Some detackifiers of the prior art tend to render paint in the water as fine dispersion that is not readily removable. It is desirable that the detackified paint be easily removable from the water system, without costly and time-consuming shutdowns for cleaning of the sump and piping and disposal of the wash water. One means of rendering the paint readily removable is the introduction of additives such as flocculents that cause the detackified paint to aggregate into small clumps that can then be removed from the water.

Examples of commercial detackification chemicals include melamine formaldehyde solutions, such as those taught in U.S. Pat. No. 5,599,884, incorporated herein by reference. Melamine formaldehyde products have the drawback of requiring a flocculent to cause adequate agglomeration of the detackified paint for removal. The functioning of known melamine formaldehyde products is also pH sensitive, requiring pH adjustment to maintain effectiveness. Too high pH results in undesirable foaming of the resident water, while too low pH results in poor detackfication performance. Flocculents are provided in a separate package, as is an alkali for pH control. The three-package system, of detackifier, flocculent and alkali is generally added at different locations in the system. This multiple additive product is inconvenient and has the potential for introducing error by use of incorrect proportions of the separate parts.

Other known products that detackify and flocculate paint in the prior art include compositions based upon clay. One standard definition for the term "clay" is that of a "naturally occurring sediment (including that obtained by alteration in situ by supergene and hydrothermal processes) or sedimentary rock composed of one or more minerals and accessory compounds, the whole usually being rich in hydrated silicates of aluminum, iron or magnesium, hydrated alumina, or iron oxide, predominating in particles of colloidal or near-colloidal size, and commonly developing plasticity when sufficiently pulverized and wetted." Kirk-Othmer, Encyclopedia of Chemical Technology, Volume 5, page 544, (2nd edition) John Wiley and Sons, Inc., New York, N.Y. 1964.

U.S. Pat. No. 4,629,572 discloses the use of condensation resins of aldehyde and nitrogeneous compounds such as urea, melamine, thiourea, dicyanadiamide, substituted melamine and others in combination with clay. The two additives are charged separately to the circulating water to avoid coagulation of these components. The resin used in this detackifier is not cured to the extent that it forms an insoluble and infusible product. Like the clay flocculent, the resin is used in the form of a colloidal suspension.

The clay-based systems are capable of detackifying and flocculating paints, but have the drawback of substantially increasing the turbidity of the treated water. The increased turbidity is evidence of the presence of a substantial amount of colloidal particles remaining in the treatment water. This gives the treatment water an unappealing cloudy appearance. Further, in use, the water treatment system tends to build up increasing amounts of the colloidal material as more clay treatment is added to the system. Over time, this build-up negatively affects the water system's air scrubbing efficiency. A treatment or additive for paint booth water that avoids this drawback is desirable.

It is also desirable that the additive be dispersible in the paint booth water system with reasonable efficiency. An additive that requires auxiliary equipment for dispersing, requires separate measurement and addition of individual components or requires separate addition times and locations would increase the operation costs and service time required. Hence, it is desirable that the additive can be provided in suitable form to be added as a single charge directly to the water system, and be dispersed homogeneously therein rapidly, at normal operating temperatures and without agitation other than that provided by the normal operation pumping action and the like.

As noted above, it is preferable that the paint sludge formed floats on or near the top of the water present in the sump. Sinking sludge requires shutdown of the paint booth for periodic cleaning and sludge removal, which adds cost. Generating such floating sludge, and reducing the amount of sinking sludge, is desirable and extends the time between sump cleanings. Generation of floating sludge in some systems is assisted by air flotation means. The removal of the sludge on or near the top of the water may be accomplished using one or more of a variety of systems, including without limitation by skimming, by screening of straining, by dispersing the sludge in the water of the system and then discharging a portion of such water, and the like. In some operations, the sludge removal is continuous and such continuous sludge removal systems frequently use a pedal wheel, skimmer, or a side-stream sludge removal when an air assisted floating unit is used to separate the sludge from the water. As noted above, efficient sludge removal is dependent in part on sludge characteristics. The paint should be well detackified and the sludge preferably should be cohesive.

There is a need for a product that both detackifies and flocculates paint without additional ingredients, while providing improved water clarity and facilitating paint and paint sludge removal. There is also a need for a easy means for treating paint booth water systems, for example by eliminating multiple packages, measurement of multiple ingredients, different addition locations, and frequent pH monitoring and adjustment.

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, throughout the description, unless expressly stated to the contrary: percent, "parts of", and ratio values are by weight or mass; the term "polymer" includes oligomer, copolymer, terpolymer and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) noted in the specification between one or more newly added constituents and one or more constituents already present in the composition when the other constituents are added, and does not preclude unspecified chemical interactions among the constituents of a mixture once mixed; specification of constituents in ionic form additionally implies the presence of sufficient counter ions to produce electrical neutrality for the composition as a whole and for any substance added to the composition; any counter ions thus implicitly specified preferably are selected from among other constituents explicitly specified in ionic form, to the extent possible; otherwise such counter ions may be freely selected, except for avoiding counter ions that act adversely to an object of the invention; the word "mole" means "gram mole", and the word itself and all of its grammatical variations may be used for any chemical species defined by all of the types and numbers of atoms present in it, irrespective of whether the species is ionic, neutral, unstable, hypothetical, or in fact a stable neutral substance with well defined molecules; the term The terms "solution", "soluble", "homogeneous", and the like are to be understood as including not only true equilibrium solutions or homogeneity but also dispersions that show no visually detectable tendency toward phase separation over a period of observation of at least 100, or preferably at least 1000, hours during which the material is mechanically undisturbed and the temperature of the material is maintained within the range of 18–25° C. The term "paint" as used herein includes paint in its ordinary sense, that is, a mixture of pigment and a suitable liquid vehicle that is reasonably fluid and provides a thin and adherent coating when spread on an appropriate surface. The term "paint" as used herein also includes other paint-like fluid coating materials. Hence, the term "paint" as used herein refers to paints, lacquers, varnishes, base coats, clear coats and the like.

SUMMARY OF THE INVENTION

Applicant has surprisingly discovered a composition and method for treating paint booth water systems that provides the above-identified desirable features and overcomes drawbacks of the prior art water treatment compositions. Accordingly, it is an object of the invention to provide a composition for treating paint booth water systems to facilitate paint removal comprising water and a) a first component comprising solid particles of insoluble organic polymer dispersed in the composition, b) a second component selected from the group consisting of surfactants, thickeners, polymeric flocculents different from a), and mixtures thereof; and optionally c) clarifiers, anti-corrosive components, and/or biocides. It is a further object of the invention to provide the composition wherein the solid particles of the organic polymer are less than 100 microns in diameter and/or wherein less than 50 weight percent of the solid particles of the organic polymer are colloidal in size. The amount of the first component can range from 3–45 weight percent of the composition.

In a preferred embodiment, the organic polymer comprises an infusible urea methanal copolymer and the second component comprises polymeric flocculents comprising non-ionic or cationic polyacrylamide.

Another aspect of the invention provides a composition(I) for detackifying and flocculating paint in a paint booth water system consisting essentially of water and a) a component comprising dispersed insoluble solid organic polymer; b) one or more surfactants and/or polymeric flocculents different from a); and optionally clarifiers, anticorrosive components, thickeners and/or biocides; wherein less than 50 weight percent of said organic polymer is insoluble particles of diameter 1 micron or less.

It is yet another object of the invention to provide a homogeneous pre-mixed composition for treating paint booth water systems comprising, in one package, a composition according to the invention.

Another aspect the invention provides a composition comprising water and a) a first component comprising insoluble particles of a storage stable organic polymer dispersed in said composition, said organic polymer comprising reactive methylol groups; and b) a second component comprising at least one of a surfactant, a thickener and a polymeric flocculent different from a) wherein the insoluble particles of a) are less than 100 microns in diameter, and less than 50 weight percent of said particles are colloidal. In a further object of the invention, the average particle size of the insoluble particles is greater than 1 micron in diameter.

A different aspect of the invention is a paint booth water system which comprises resident water, paint and a composition(I) for detackifying and flocculating the paint, the composition(I) comprising a liquid medium and a) a first component comprising solid particles of insoluble organic; b) a second component selected from the group consisting of surfactants, thickeners, polymeric flocculents different from a), and mixtures thereof; and optionally clarifiers, anticorrosive components, and/or biocides wherein the system is substantially free of flocculents different from (I). It is a yet further object of this invention to provide a system wherein the ratio of parts by volume of composition(I) to parts by volume of paint is about 0.40:1.0 to about 1.0:1.0.

A different aspect of the invention provides a method of treating and removing paint contained in resident water of a paint booth water system comprising adding an aqueous composition(I) made according to the invention to the paint booth water system, mixing the aqueous composition with resident water of the paint booth water system to form a detackified paint flocculent and removing the paint flocculent from the paint booth water system. It is a further object of this method to provide a water system wherein the aqueous composition is added in amounts sufficient to provide a ratio of parts by volume of composition to parts by volume of paint of about 0.40:1.0 to about 1.0:1.0. It is preferred that the method is practiced whereby the addition step a) is a single charge or multiple charges of a single mixture comprising all components of said aqueous composition in one package. It is a yet further object of the invention that the system is substantially free of flocculents different from (I).

These and other aspects and benefits of the invention will become more clear upon review of the detailed description and embodiments of the invention.

DETAILED DESCRIPTION OF A PREFERRED EMBODIMENT

This invention provides a composition for detackifying and flocculating paint overspray in paint booth water systems comprising an aqueous dispersion of a solid organic polymer, and optionally other components including surfactants, anticorrosives, biocides, thickeners, and clarifiers. The composition provides the advantages of both detackifying and flocculating paint and, while the use of additional flocculents is not ruled-out, no additional flocculents are required. The composition detackifies solvent-borne paint and forms a floating paint flocculent that is readily removed from the water system. The composition is also useful in treating water systems for water-borne paint, where the composition forms a floating paint flocculent with the water-borne paint dispersed in the sump.

The inventive composition is made by adding the component comprising the solid organic polymer and any desired optional ingredients to a liquid medium and mixing thoroughly to provide a homogeneous dispersion of the insoluble particles. The liquid medium is substantially aqueous, and preferably is deionized water. The amount of organic polymer component in the composition is at least, with increasing preference in the order given, 2, 4, 6, 8, 10 weight percent and independently preferably is not more than, with increasing preference in the order given, 50, 40, 30, 20 weight percent. Percentages of solid that are greater than about 50% tend to make the composition thicker than is desirable for easy dispersal in the paint booth water system. Reducing the amount of organic polymer component to less than 2 weight percent of the composition has a negative effect on performance where composition to paint ratios are kept relatively constant in the paint booth water system. The composition typically is comprised of approximately 5–40 weight percent organic polymer component.

Another valuable feature of the composition is that it can be premixed during manufacture and dispensed from a single package. The premixed composition is a stable dispersion of solid organic polymer particles in a liquid, preferably substantially aqueous medium. The composition also functions at a wider pH range than melamine formaldehyde resins of the prior art thereby eliminating the need for chemicals for pH control.

An advantage of the invention over colloidal dispersions, including but not limited to clay additives, is the improved clarity (low turbidity) of the water in the system. Applicant believes, without being bound by any one theory, that the size of the particles in the polymer dispersion of the invention aids the flocculation of paint and clarity of the resident water in the paint booth water system. As discussed above, typical prior art colloidal systems, such as clay, result in turbid resident water. Turbidity is known to result from the retention in the resident water of colloidal particles. Colloidal particles are defined as matter having one or more of its dimensions in the range between 1 millimicron (nanometer) and 1 micron (micrometer). Generally, solid colloidal particles are small enough to pass through standard filter membranes and do not settle out of suspension by gravity.

Particle size ranges are selected to facilitate paint detackification, flocculation and removal by maximizing the surface area available for contact with paint, without interfering with the water clarity benefits achieved by the composition. Thus, although colloidal particles have the greatest surface area to density ratio, use of large percentages of colloidal particles is not preferred since colloidal particles' small size makes them tend to be difficult to remove from water. Dispersion characteristics are also important in selecting particle size. Solid colloidal particles tend to form clumps when combined with a liquid medium. A solid component comprising too high a percentage of colloidal particles tends to be difficult to disperse evenly in a liquid medium. The surface to density ratio must be sufficient to allow the particles to remain dispersed in the composition. Large particles typically have a low surface area to density ratio, which causes them to settle out of the dispersion. It is desirable that the maximum particle size be limited to particles that can form an aqueous dispersion that is stable for at least 1000 hours at room temperature. As is known in the industry the maximum suitable size for particles will vary depending on the viscosity of the composition. Preferably the maximum particle size is, with increasing preference in the order given, not greater than about 100, 75, 50, 40, 35, 30, 24, 20, 18, 16, 14. The maximum particle size may be readily selected by one of skill in the art by use of known filtering or other separation means.

It is desirable that the water insoluble portion of the composition, including the solid organic polymer, that is made up of colloidal particles is limited, preferably to 50% or less of overall particle amounts. It is thought that a decreased amount of colloidal particles dispersed in the composition results in improved flocculation and water clarity. Low turbidity is an indicator of the amount of particulate matter remaining in the water. The low turbidity resulting from use of the instant invention to treat the water shows improved removal of dispersed particles, as compared to clay systems. Water having good clarity is also cosmetically preferable.

The inventive composition has polymer particles dispersed therein that have an average particle size that is greater than about 1 micron. Preferably, the average particle size is not less than about, with increasing preference in the order given, 1.5, 2.0, 2.5, 3.0, 3.5, 4.0, 4.5, 5.0, 5.5, 6.0 microns and independently preferably is, with increasing preference in the order given, not greater than about 18, 16, 14, 12.5, 11.0, 10.0, 9.0, 8.5, 8.0. The average particle size typically ranges from about 3 to about 10 microns.

Generally, the particle size distribution for the component comprising the solid organic polymer has an upper limit determined by the manufacturing method and any filtering or particle separation devices used to remove oversized particles. Some colloidal particles, particularly where the polymer is produced by grinding larger agglomerates, are present in the component. Preferably the maximum amount of particles of 1 micron or less in the component comprising the solid organic polymer is, with increasing preference in the order given, not greater than about 40, 30, 20, 15, 13, 11, 10, 9, 8, 7.5, 7, 6.5, 6, 5.5, 5 percent.

In a first embodiment, the particle size distribution for the component comprising the solid organic polymer is $d_{50}$ 6–8.5 microns, $d_{90}$ 15–19 microns, while $d_{100\ is}$ 36 microns, as measured by laser diffraction techniques known in the industry. "Dxx" is a measurement of the percentage of particles that are less than a certain size and "xx" denotes the percentile. For example, where $d_{100\ is}$ 36, the diameter of 100 weight percent of the particles is less than 36 microns. The $d_{50}$ data point also provides information on the amount of larger particles. Where $d_{50}$ is 6–8.5, the diameter of 50 weight percent of the particles is less than 6–8.5 microns, and the diameter of the remaining 50 percent of the particles is greater than or equal to 6–8.5 microns and less than 36 microns. Based upon this data, it can be seen that more than 50% of the polymer particles are non-colloidal. At least 50% of the polymer particles range in size from approximately 6 to 36 microns. In this embodiment, 10 weight percent of the particles have a diameter of less than 1.30 microns and 7.3 weight percent of the particles have a diameter of less than 1.00 micron. The average particle size is 8.43 microns.

In another embodiment, the polymer solids range in size from 0.1–0.5 microns, and form agglomerative particles of noncolloidal size as follows (in microns): $d_{50}$ 3.5–6, $d_{90}$ 9–12.5, with $d_{100}$ 18. Where $d_{50}$ is 3.5–6, the diameter of 50 weight percent of the agglomerative particles is less than 3.5–6 microns, and the diameter of the remaining 50 percent of the agglomerative particles is greater than or equal to 3.5–6 microns and less than 18 microns in diameter. In this embodiment, more than 50% of the polymer agglomerative particles are non-colloidal. At least 50% of the polymer agglomerative particles range in size from approximately 3.5 to 18 microns.

In an alternative embodiment, a minimum particle size can be selected, but such particle ranges require particle separation processing that increases costs. In the alternative embodiment, the preferred minimum particle size is not less than, with increasing preference in the order given 0.1, 0.5, 1.0, 1.5, 2.0, 2.5, 3.0 microns.

Each organic polymer molecule contains several reactive methylol groups. It is desirable that the amount of reactive methylol groups present in the polymer be such that the reactive methylol groups interact with paint globule surfaces to form a readily separable and detackified flocculent. The amount of reactive methylol groups in the polymer desirably ranges from about 0.4 to about 0.8 weight percent, but can be more provided that the reactive methylol groups do not interfere with the water treatment in the system or render the polymer-containing component unstable. The organic polymer component should be storage stable, meaning remaining substantially chemically unchanged for at least 100, desirably 100 hours at STP (standard temperature and pressure). Preferably, the amount of reactive methylol groups in the polymer is not less than, with increasing preference in the order given, 0.4, 0.5, 0.55, 0.6 weight percent. One embodiment of the invention utilizes an infusible, essentially insoluble solid urea methanal copolymer comprising approximately 0.6 weight percent reactive methylol groups. The molecular weight of the polymer is not critical, however, the preferred molecular weight generally ranges from about 1,000 to about 50,000.

Preferred organic polymers of the invention are urea methanal copolymers comprising condensation reaction products of urea and methanal. A component comprising the urea methanal copolymer may include various amounts of water and unreacted monomer. In one embodiment, the urea methanal component has a residual formaldehyde content of less than about 0.1 weight percent. The urea methanal component may be solid or a paste. It is desirable that the component has a solids content that is at least, with increasing preference in the order given, 70, 75, 80, 83, 84 weight percent and independently preferably is not more than, with increasing preference in the order given, 100, 98, 95, 90, 85 weight percent. The urea methanal copolymer component is preferably less than 30 weight percent water. The urea methanal copolymer should be readily dispersible in water, but it is preferred that the copolymer be substantially insoluble in water. Suitable urea methanal copolymers are commercially available from Martinswerk GmbH, under the trade names Pergopak M, Pergopak M2, Pergopak M3, Pergopak M4, and Pergopak M5.

Surfactants are desirable components of the inventive compositions. Surfactants improve dispersal of particulate matter, in this case the organic polymer. Any surfactant suitable for use in a water effluent application that does not interfere with the detackifying and flocculating functions of the invention is acceptable. The ratio of the amount of surfactant, if present, to the amount of organic polymer component ranges from about 1:7 to about 1:15, preferably from about 1:9 to about 1:13. Examples of suitable surfactants include ethoxylated alcohols, such as Surfynol products (Air Products), and/or other dispersants such as Disperbyk (Byk Chemie) and/or Tamol (Rohm & Haas).

Optional polymeric flocculents, different from the organic polymer a), may be added to the composition to further improve paint flocculation and water clarity. The optional flocculent can be used with or without the surfactant and thickener. Some polymeric flocculents provide rheological and dispersive properties to the dispersion that render the use of surfactant and/or thickener unnecessary. Determining whether use of surfactant and/or thickener is advantageous in a composition also comprising the polymeric flocculent is a matter within the knowledge of one of ordinary skill in the art. Any known polymeric flocculents compatible with the other components of the composition may be used, provided they do not interfere with the detackification action of the dispersion and do not cause flocculation of the dispersion in the absence of paint. It is preferred that the flocculating polymers are included in the single package system with the other components and do not require separate packaging or addition. The ratio of the amount of polymeric flocculent, if present, to the amount of organic polymer component ranges from about 1:2 to about 1:10, preferably from about 1:3 to about 1:8. Suitable examples of the polymeric flocculent include non-ionic and cationic polyacrylamide and the like. A suitable cationic polyacrylamide is Agefloc WT-9503 (Ciba).

Optional clarifiers may also be used in the composition to further improve the clarity of the booth water and aid in flocculation of the paint sludge. It is desirable that the amount of clarifier, if present, is at least, with increasing preference in the order given, 0.1, 0.3, 0.5, 0.7, 0.8, 1 weight percent and independently preferably is not more than, with increasing preference in the order given, 10, 8, 6, 5, 4, 3, 2 weight percent. Suitable clarifiers are substances known to those of skill in the art and include, by way of non-limiting example magnesium sulfate.

Thickeners may be added to the composition to provide a smoother consistency. The amount of thickener is not critical to the functioning to the composition, but provides a smoother consistency that aids in stability of the dispersion and in application (pumpability) of the product. Any thickeners compatible with the other components are suitable. Examples of suitable thickeners include xanthan gums such as Kelzan (Kelco, a division of Merck) and cellulose thickeners such as Natrosol 250 HR PA (Hercules).

Generally, it is desirable to include an anti-corrosive and/or rust preventative in compositions of the invention to protect the metallic components of the paint booth water system from contact with the aqueous environment. Suitable examples are those anti-corrosives and/or rust preventatives that do not interfere with paint detackification and flocculation including sodium nitrite (Van Waters & Rogers) or materials such as Irgacor 1405 (Ciba).

It is also desirable to include a biocide in the inventive compositions to prevent microbial attack of organic components and to discourage the growth of microorganisms in the paint boot water system. Microorganism growth can cause health concerns for workers employed in the area of the paint booth and generally gives off objectionable odors. Any biocide suitable for use in a water effluent application that does not interfere with the detackifying and flocculating functions of the invention is acceptable, and can include azo and oxazo chemistries. Examples of suitable biocides include Dowicil 75 (Dow Chemical) and Nuosept 145 (ISP Laboratories).

The quantities of the optional anti-corrosive and/or rust preventative and biocide components, if present, in the composition are not critical to the detackifying and flocculating function of the composition. These components are included to provide the user with a convenient single package treatment for the paint booth water system. Determining the appropriate amount of these optional components is a matter of routine experimentation well within the knowledge of one of ordinary skill in the art.

An effective amount of the composition should be added to or maintained in the water being treated to provide continuous protection to the surfaces of the paint booth water system. Relative to the composition, the term "effective amount" refers to that amount that achieves the desired detackification and flocculation of paint in the system being treated. The composition can be applied intermittently or continuously to the water system being treated. The preferred dosage is from between about 0.40 to about 1.0 part composition per part paint, most preferably between about 0.50 and about 0.70 part composition per part paint, where parts are measured as parts by volume. In the Examples, a blender test is used for purposes of laboratory screening of detackification systems. The blender test uses the whole of the paint, paint solvents included. In practice in a paint spray booth, most of the paint solvents are lost during spraying with the air extraction of the booth system so mostly paint solids will enter the paint booth water system. This often means that a lesser composition to paint ratio can be used in the field than in the blender test herein described.

Since spraying is generally continuous, continuous addition of the composition is preferred. It is beneficial to add an effective amount of the inventive composition prior to initiating paint spraying, so as to obtain the maximum prophylactic effect of the water treatment. The composition can be added at any convenient location, but is preferably added so as to allow the maximum concentration of the composition to contact the over-sprayed paints. In a typical paint spray booth operation, the return water from the booth generally encounters turbulence. This turbulence improves the efficacy of the treatment by promoting intimate contact between the paint and the inventive composition and assists in flotation through aeration of the paint sludge.

The invention will now be further described with reference to a number of specific examples, which are to be regarded solely as illustrative and not as restricting the scope of the invention.

EXAMPLES

Example 1

A urea-methanal copolymer dispersion composition of the invention was compared to a clay dispersion water treatment product of the prior art. Example 1 was produced by mixing the components recited in Table I.

TABLE I

| Example 1 | Wt. % |
| --- | --- |
| DI Water | 83.7 |
| Organic Copolymer I | 13.0 |
| Surfactant | 1.2 |
| Biocide | 0.3 |
| Anti-corrosive | 0.3 |
| Thickener | 0.5 |
| Magnesium sulfate | 1.0 |

Organic Copolymer I was a urea methanal copolymer having a residual formaldehyde content of less than about 0.1 percent, a density of approximately 1.47, a pH of 8–9.5, and approximately 0.6 weight percent reactive methylol groups. Copolymer I was a particulate solid having a solids content in the range of 83–90 weight percent. The range of particle sizes (in microns) for Copolymer I was $d_{50}$ 6–8.5, $d_{90}$ 15–19, while $d_{100}$ was 36. The surfactant was Surfynol 440 (Air Products), the biocide was Dowicil 75 (Dow Chemical), the anti-corrosive was sodium nitrite and the thickener was Kelzan CC (Kelco, a division of Merck). Magnesium sulfate was added to improve the clarity of the booth water and aid in flocculation of the paint sludge. Comparative Example 1 was a clay dispersion product comprising a single package of opaque liquid composition containing kaolin and bentonite clays and comprising approximately 10–30% solids. A two-pack clear-coat paint used for wood finish was used as test paint.

Procedure:

The samples were tested according to the following procedure: 500 ml of water was added to a 1000 ml blender flask. 0.3 ml of a test sample was added to the blender flask and mixed for 30 seconds at low to medium speed sufficient to create a visually apparent vortex. No pH adjustment or separate addition of a flocculent was made. With continued mixing, 0.3 ml of paint was added to the edge of the vortex and mixed for an additional 2 minutes. Mixing was stopped and the sample examined for flocculation of the paint, turbidity, paint detackification, sludge, flotation and foam formation. Turbidity was measured within 1 minute of the blender being turned off using a Turbidity Meter 66120-200 from VWR Scientific. The meter measures turbidity in nephelometric turbidity units (NTU), which are an accepted standard. Turbidity measured in NTU uses nephelometric methods that depend on passing light of a specific wavelength through the sample. The higher the NTU number the more turbid (and less clear) is the test sample.

Comparative Example I did not detackify the paint, even after the amount of clay dispersion product added to the blender flask was increased from 0.3 ml to 1.5 ml, a five-fold increase. Comparative Example I also produce poor water clarity, as shown in Table II.

TABLE II

| Example | Amount added (ml) | Turbidity (NTU) |
| --- | --- | --- |
| Comparative Example I | 0.3 | 271.4 |
| Comparative Example I | 1.5 | 526.4 |
| Example I | 0.3 | 72.6 |

As the amount of clay dispersion product added increased, the turbidity measured increased. When the water was analyzed, it was found to contain clay. The clay product was adding to the suspended particles in the water.

The addition of 0.3 ml of the dispersion of Example 1 successfully detackified the two-pack clear-coat paint to the point where it would ball up and not stick or smear when rolled between the fingers. No foam was produced and the paint sludge collected was dense and formed large particles. The clarity was very good when compared to the clay product; turbidity was measured at 72.6 NTU.

Example 2

Performance of the urea-methanal copolymer dispersion composition of Example 1 was compared with a colloidal melamine formaldehyde dispersion. Comparative Example 2 comprised a three-part water treatment product comprising 1) colloidal melamine formaldehyde dispersion, 2) polyacrylamide flocculent and 3) pH adjustment additive.

The experimental procedure of Example 1 was followed, except that an alkali, sodium carbonate, was used to adjust the pH of the water to 8–9 before addition of the other ingredients of Comparative Example 2. Thereafter, 0.3 ml of melamine formaldehyde colloidal dispersion was added to the blender flask and mixed for 30 seconds. 0.3 ml of the two-pack clear-coat paint was added to the edge of the mixing vortex and the blender was left to run for 2 minutes. 0.5 ml of a 0.5 weight percent solution of a polyacrylamide flocculent was added to the blender and mixed for 10 seconds. Mixing was stopped and the sample examined for flocculation of the paint, turbidity, paint detackification, sludge, flotation and foam formation.

Comparative Example 2 produced no foam, good sludge separation, dense paint sludge that floated and a turbidity of 72.1 NTU. Example 2 behaved the same as in Example 1, with good detackification, no foam, dense paint sludge that floated and a turbidity of 73.4 NTU. Example 2 and Comparative Example 2 required about 0.3 ml to completely detackify the paint to a point where it balled up and did not smear when collected and rolled between the fingers. Both systems were efficient, produced low foam and good detackification. However, the one-pack system requires only one product addition and control in the booth system, whereas the standard melamine formaldehyde colloidal detackification system requires the addition and control of three separate chemicals.

The inventive compositions did not require pH correction, in contrast the melamine formaldehyde solution is relatively pH sensitive and required monitoring of the pH. The inventive compositions performed comparably to the melamine formaldehyde solution and had another advantage of not requiring the addition of flocculent, which is required for use of melamine formaldehyde solutions.

Example 3

The effect of urea methanal copolymer particle size on performance of compositions of the invention was tested. Samples 1 and 2 were made according to the invention and comprised urea methanal copolymers having a residual formaldehyde content of less than about 0.1 percent, a density of approximately 1.47, a pH of 8–9.5, and approximately 0.6 weight percent reactive methylol groups. Copolymer I had a solids content in the range of 83–90 weight percent. The range of particle sizes (in microns) for Copolymer I was $d_{50}$ 6–8.5, $d_{90}$ 15–19, while $d_{100}$ was 36. Copolymer II was primarily comprised of particles ranging in size from 0.1–0.5 microns that, according to the manufacturer, formed agglomerative particles ranging in size as follows (in microns): $d_{50}$ 3.5–6, $d_{90}$ 9–12.5, with $d_{100}$ 18. Copolymer II had more than 50 weight percent particles of diameter in the range of 3.5–18 microns, and a solids content in the range of 83–95 weight percent. The dispersions of Samples 1 and 2 were made by mixing the components recited in Table III. The surfactant was Surfynol 440 (Air Products), the biocide was Dowicil 75 (Dow Chemical), and the anti-corrosive was sodium nitrite.

TABLE III

|  | Sample 1 | Sample 2 |
| --- | --- | --- |
| DI Water | 300.0 g | 300.0 g |
| Organic Copolymer I | 64.4 g | — |
| Organic Copolymer II | — | 65.7 g |
| Surfactant | 6.0 g | 6.0 g |
| Biocide | 1.0 g | 1.0 g |
| Anti-corrosive | 1.5 g | 1.5 g |
| Thickener | — | — |

The experimental procedure of Example 1 was followed for Samples 1 and 2. No pH adjustment or flocculent addition was made. Both Samples performed similarly, complete detackification of the paint was accomplished at 0.3 ml addition of the sample. The only difference between performance of Samples 1 and 2 was in the resulting turbidity of the resident water. Sample 1 produced an average turbidity of 76.8 NTU after 3 test runs and Sample 2 produced an average turbidity of 73.3 NTU after 3 test runs. Samples of lower particle size produce slightly reduced turbidity but the effect was small.

Example 4

A polymeric flocculent, different from Organic Copolymer I, was included in a urea-methanal dispersion according to the invention, which was made by mixing the components recited in Table IV.

TABLE IV

| Example 4 | Wt. % |
| --- | --- |
| DI Water | 81.9 |
| Organic Copolymer I | 13.0 |
| Polymeric Flocculent | 3.5 |
| Biocide | 0.3 |
| Anti-corrosive | 0.3 |
| Magnesium sulfate | 1.0 |

The polymeric flocculent was mixed directly with the other components of the dispersion and did not cause coagulation or flocculation of the dispersion. The composition comprising polymeric flocculent may also include surfactant and thickener, but in this polymeric flocculent gave some rheological and dispersive properties to the dispersion, and was used alone. The polymeric flocculent was a cationic polyacrylamide, Agefloc WT-9503 (Ciba).

The procedure according to Example 1, using the 2-pack clear-coat paint and the Example 4 dispersion, was followed. 0.3 ml of Example 4 dispersion was used to 0.3 ml paint. 0.3 ml of the Example 4 dispersion successfully detackified the paint to the point where it balled up and did not smear when handled. The turbidity was measured at 59.3 NTU, which is an improvement in clarity compared to the dispersion used in Example 1. The addition of the polymeric flocculent improved the clarity of the water and did not cause the self-flocculation of the Example 4 dispersion. The turbidity of the water can be further reduced by adding a polymeric flocculent to the urea-methanal dispersion.

A comparison of the Example 1 and 2 results with the results obtained in the Comparative Examples shows that the use of the composition of the invention presents a significant improvement over the use of either melamine formaldehyde resin or clay alone.

Although the invention has been described with particular reference to specific examples, it is understood that modifications are contemplated. Variations and additional embodiments of the invention described herein will be apparent to those skilled in the art without departing from the scope of the invention as defined in the claims to follow. The scope of the invention is limited only by the breadth of the appended claims.

What is claimed is:

1. A method of treating and removing paint contained in resident water of a paint booth water system comprising:
    a) adding an aqueous composition(I) to the paint booth water system, said composition comprising,
        1) a first component comprising solid particles of infusible urea methanal polymer dispersed in said composition;
        2) a second component selected from the group consisting of surfactants, thickeners, polymeric flocculents different from 1), and mixtures thereof, and optionally
        3) clarifiers, anti-corrosive components, and/or biocides,
    b) mixing the aqueous composition with resident water of the paint booth water system to form a detackified paint flocculent;
    c) removing the paint flocculent from the paint booth water system.

2. The method of claim 1 wherein the aqueous composition is added in amounts sufficient to provide a ratio of parts by volume of composition to parts by volume of paint of about 0.40:1.0 to about 1.0:1.0.

3. The method of claim 1 wherein the addition step a) is a single charge or multiple charges of a single mixture comprising all components of said aqueous composition in one package.

4. The method of claim 1 wherein said organic polymer is the condensation product of urea and methanal and the system is substantially free of flocculents different from (I).

5. A method of treating and removing paint contained in used resident water of a paint booth water system comprising:
    a) adding an aqueous composition(I) to the paint booth water system, said composition comprising,
        i. a first component comprising solid particles of infusible urea methanal polymer dispersed in said composition;

ii. a second component selected from the group consisting of surfactants, thickeners, polymeric flocculents different from i), and mixtures thereof; and optionally iii. clarifiers, anti-corrosive components, and/or biocides b) mixing the aqueous composition with the used resident water of the paint booth water system to form a detackified paint flocculent and clarified resident water having lower turbidity than said used resident water, c) removing the paint flocculent from the paint booth water system.

6. The method of claim 5 wherein the polymer comprises an infusible urea methanal copolymer.

7. The method of claim 5 wherein the addition step a) is a single charge or multiple charges of a single storage stable mixture comprising all components of said aqueous composition in one package.

8. The method of claim 5 wherein less than 50 weight percent of the solid particles of the polymer are colloidal in size.

9. The method of claim 5 wherein the amount of the first component ranges from 3–45 weight percent of the composition.

10. The method of claim 5 wherein the second component comprises polymeric flocculents comprising non-ionic or cationic polyacrylamide.

11. A method for treating paint booth water systems to facilitate paint removal comprising:
  a. adding an aqueous composition(I) to the paint booth water system, said composition comprising,
    i. a first component comprising particles of an infusible urea methanal dispersed in said composition, said polymer comprising reactive methylol groups; and
    ii. a second component comprising at least one of a surfactant, a thickener and a polymeric flocculent different from i);
  b. mixing the aqueous composition with resident water of the paint booth water system to form a detackified paint flocculent,
  c. removing the paint flocculent from the paint booth water system;

wherein the particles of i) have an average particle size of from about 1.5 to 18 microns, and less than 40% of said particles are colloidal.

12. The method of claim 11 wherein the average particle size of the particles is from about 3 to about 10 microns.

13. The method of claim 11 wherein the ratio of parts by volume of composition(I) to parts by volume of paint is about 0.40:1.0 to about 1.0:1.0.

14. The method of claim 11 wherein the system is substantially free of flocculents different from (i).

15. A method for detackifying and flocculating paint in a paint booth water system comprising:
  a. adding an aqueous composition(I) to the paint booth water system, said composition consisting essentially of water and;
    i. a component comprising dispersed insoluble solid infusible urea methanal polymer;
    ii. one or more surfactants and/or polymeric flocculents different from i); and optionally
    iii. clarifiers, anticorrosive components, thickeners and/or biocides;
  b. mixing the aqueous composition with resident water of the paint booth water system to form a detackified paint flocculent;
  c. removing the paint flocculent from the paint booth water system;

wherein less than 50 weight percent of said polymer is particles of diameter 1 micron or less.

16. The method of claim 15 wherein the insoluble solid polymer comprises an infusible urea methanal copolymer.

17. The method of claim 15 wherein the particle size distribution for the component comprising the insoluble solid polymer is $d_{50}$ 6–8.5 microns.

18. The method of claim 15 wherein insoluble polymer solids merge in size from 0.1–0.5 microns, and form agglomerative particles of noncolloidal size such that 50 percent of the agglomerative particles have a diameter greater than or equal to 3.5 microns and less than 18 microns.

* * * * *

UNITED STATES PATENT AND TRADEMARK OFFICE
CERTIFICATE OF CORRECTION

| | | |
|---|---|---|
| PATENT NO. | : 7,179,385 B2 | Page 1 of 1 |
| APPLICATION NO. | : 10/454956 | |
| DATED | : February 20, 2007 | |
| INVENTOR(S) | : Foster | |

It is certified that error appears in the above-identified patent and that said Letters Patent is hereby corrected as shown below:

Column 16, line 36, delete "merge" and insert therefore --range--.

Signed and Sealed this

Twenty-sixth Day of June, 2007

JON W. DUDAS
*Director of the United States Patent and Trademark Office*

UNITED STATES PATENT AND TRADEMARK OFFICE
CERTIFICATE OF CORRECTION

PATENT NO. : 7,179,385 B2
APPLICATION NO. : 10/454956
DATED : February 20, 2007
INVENTOR(S) : Foster It is certified that error appears in the above-identified patent and that said Letters Patent is hereby corrected as shown below:

Column 14, line 57, delete "organic".
Column 16, line 36, delete "merge" and insert therefore --range--.

This certificate supersedes Certificate of Correction issued June 26, 2007.

Signed and Sealed this

Twenty-first Day of August, 2007

JON W. DUDAS
*Director of the United States Patent and Trademark Office*

UNITED STATES PATENT AND TRADEMARK OFFICE
CERTIFICATE OF CORRECTION

PATENT NO. : 7,179,385 B2
APPLICATION NO. : 10/454956
DATED : February 20, 2007
INVENTOR(S) : Foster It is certified that error appears in the above-identified patent and that said Letters Patent is hereby corrected as shown below:

Title page, (56) References Cited, U.S. PATENT DOCUMENTS, delete the existing list of U.S. patent documents and insert in place thereof:

| | | | |
|---|---|---|---|
| --4,629,572 A* | 12/1986 | Leitz et al. | 210/714 |
| 4,656,059 A* | 4/1987 | Mizuno et al. | 427/345 |
| 4,806,985 | 2/1989 | Foley et al. | |
| 4,902,779 | 2/1990 | Waldmann | |
| 4,904,393 A* | 2/1990 | Mitchell et al. | 210/712 |
| 5,073,205 | 12/1991 | Morse | |
| 5,092,928 | 3/1992 | Spangler | |
| 5,130,028 | 4/1992 | Cody et al. | |
| 5,114,591 | 5/1992 | Patzelt et al. | |
| 5,143,624 | 9/1992 | Morse | |
| 5,167,830 | 12/1992 | Ficker | |
| 5,192,449 | 3/1993 | Huang et al. | |
| 5,200,104 | 4/1993 | Zuerner et al. | |
| 5,215,668 | 6/1993 | Bhattacharyya, deceased et al. | |
| RE 34,486 | 12/1993 | Waldemann | |
| 5,294,352 | 3/1994 | Waldmann | |
| 5,298,186 | 3/1994 | Mitchell et al. | |
| 5,302,291 | 4/1994 | Miknevich | |
| 5,382,378 A* | 1/1995 | Guerrini et al. | 252/181 |
| 5,464,556 | 11/1995 | Zuerner et al. | |
| 5,562,833 | 10/1996 | Agree et al. | |
| 5,599,884 A* | 2/1997 | Beleck | 525/509 |

UNITED STATES PATENT AND TRADEMARK OFFICE
CERTIFICATE OF CORRECTION

PATENT NO.          : 7,179,385 B2
APPLICATION NO. : 10/454956
DATED                   : February 20, 2007
INVENTOR(S)        : Foster It is certified that error appears in the above-identified patent and that said Letters Patent is hereby corrected as shown below:

Title page, (56) References Cited, U.S. PATENT DOCUMENTS (Continued)

| | | | |
|---|---|---|---|
| 5,614,103 | 3/1997 | Agree et al. | |
| 5,660,734 | 8/1997 | Agree et al. | |
| 5,684,053 | 11/1997 | Spangler | |
| 5,719,224 | 2/1998 | Agree et al. | |
| 5,730,881 | 3/1998 | Miknevich | |
| 5,985,154 | 11/1999 | Agree et al. | |
| 6,136,220 A* | 10/2000 | Agree et al. | 252/180 |
| 6,136,200 | 10/2000 | Waldmann | |
| 6,228,269 | 5/2001 | Cort | |
| 6,627,086 B2* | 9/2003 | Mahoney et al. | 210/725--. |

Signed and Sealed this

Eleventh Day of September, 2007

JON W. DUDAS
*Director of the United States Patent and Trademark Office*